(12) United States Patent
Higashino et al.

(10) Patent No.: US 7,727,478 B2
(45) Date of Patent: Jun. 1, 2010

(54) MICRO TOTAL ANALYSIS SYSTEM

(75) Inventors: Kusunoki Higashino, Osaka (JP);
Akihisa Nakajima, Sagamihara (JP);
Yasuhiro Sando, Amagasaki (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 1111 days.

(21) Appl. No.: 11/378,519

(22) Filed: Mar. 17, 2006

(65) Prior Publication Data

US 2006/0239861 A1 Oct. 26, 2006

(30) Foreign Application Priority Data

Mar. 24, 2005 (JP) ............... 2005-086681

(51) Int. Cl.
*B01L 3/02* (2006.01)
*G01N 15/06* (2006.01)
*G01N 1/00* (2006.01)
*G01N 1/14* (2006.01)
*E03B 1/00* (2006.01)

(52) U.S. Cl. ............... 422/100; 422/68.1; 422/82.05; 422/101; 422/102; 422/103; 436/161; 436/174; 210/258; 210/635; 210/656; 73/864.15; 73/864.16; 73/864.17; 73/864.21; 137/1; 137/2

(58) Field of Classification Search ............... None
See application file for complete search history.

(56) References Cited

U.S. PATENT DOCUMENTS 5,846,396 A * 12/1998 Zanzucchi et al. ............ 506/33
6,213,151 B1 4/2001 Jacobson et al.
6,500,323 B1 12/2002 Chow et al.
2001/0051338 A1 12/2001 Chan et al.
2001/0052460 A1 12/2001 Chien et al.
2002/0009374 A1 1/2002 Higashino
2004/0146874 A1 * 7/2004 Inami et al. ............ 435/6

FOREIGN PATENT DOCUMENTS

| JP | 2001-322099 A | 11/2001 |
| JP | 2004-28589 A | 1/2004 |
| JP | 2004-108285 A | 4/2004 |
| JP | 2004-270537 A | 9/2004 |

\* cited by examiner

*Primary Examiner*—Jill Warden
*Assistant Examiner*—Neil Turk
(74) *Attorney, Agent, or Firm*—Frishauf, Holtz, Goodman & Chick, P.C.

(57) ABSTRACT

A system including an inspection chip equipped with at least a pump connection having a flow path opening for interconnecting to a micro-pump, a flow path through which a fluid flows, and a fluid mixing section for joining and mixing two or more fluids, and including a system body equipped with at least a base body, a chip connection having a flow path opening for interconnecting to the inspection chip, a micro-pump unit in the base body including micro-pumps in substantially the same shape, a detection processor and a controller for controlling at least the functions of the micro-pump unit and the detection processor, and the joining amount ratio is adjusted to set the mixing ratio of two fluids to be joined in the fluid mixing section to be approximately m:n (not 1:1) by making the drive voltages of the micro-pumps substantially equal to each other.

8 Claims, 8 Drawing Sheets

MICRO TOTAL ANALYSIS SYSTEM

This application is based on Japanese Patent Application No. 2005-086681 filed on Mar. 24, 2005 in Japanese Patent Office, the entire content of which is hereby incorporated by reference.

BACKGROUND OF THE INVENTION

In recent years, due to the use of micro-machine technology and microscopic processing technology, systems are being developed in which devices and means (for example pumps, valves, flow paths, sensors and the like) for performing conventional sample preparation, chemical analysis, chemical synthesis and the like are caused to be ultra-fine and integrated on a single chip (Patent Document 1). These systems are called μ-TAS (Micro Total Analysis System), bioreactor, lab-on-chips, and biochips, and much is expected of their application in the fields of medical testing and diagnosis, environmental measurement and agricultural manufacturing. In reality, as seen in gene screening, in the case where complicated steps, skilful operations, and machinery operations are necessary, a microanalysis system which is automatic, has high speed and is simple is very beneficial not only in terms of reduction in cost, required amount of sample and required time, but also in terms of the fact that it makes analysis possible in cases where time and place cannot be selected.

For each type of analysis or inspection, since quantitativeness, analysis accuracy, economic efficiency on these analysis chips are considered as important, the task at hand is to ensure a feeding system which has a simple structure and is highly reliable. A micro fluid control element which has high accuracy and excellent reliability is needed. The inventors of this invention have already proposed a suitable micro-pump system and a control method thereof (Patent Documents 2 to 4).

In the micro total analysis system aforementioned, to mix a plurality of fluids, for example, reagents and samples in a fine flow path in a chip is incorporated as a necessary step almost without exception. Conventionally, to mix two liquids at a mixing ratio of m:n, a method for adjusting flow rates of the liquids, thereby controlling the mixing ratio has been adopted while changing drive voltages of micro-pumps for feeding the respective liquids to change generated pressures. In this method, the mixing ratio of 1:1, or any ratio close to it will provide no problem. However, when the mixing ratio is high, it is necessary to lower the drive voltage of one micro-pump considerably, relative to the other, so that a problem arises that the mixing ratio can be hardly stabilized due to the pumping force of the other one. Further, when starting to feed fluids by the micro-pumps in the initial state that there are no fluids in the flow paths, the flow paths are slowly filled with the fed fluids in process of time. Therefore, the flow path resistances which are a load of the micro-pumps are slowly increased with time and as a result, the flow speeds of the fluids fed from the micro-pumps, that is, the flow rates are lowered slowly. Even if target values of the flow rates are determined and drive voltages according to them are supplied to the micro-pumps, a problem arises that the flow rates are varied from the target values due to changes in the flow path resistances. When the flow path is additionally extended downward from the joining part of the flow paths like this case, the flow rates are varied with time due to changes in the flow path resistance of the downstream flow path and liquid feeding pressure, so that it is more difficult to stabilize the mixing ratio.

To establish a highly reliable liquid feeding system having a simple constitution, it is essential to use a micro fluid control element which is highly accurate and reliable, to be able to change freely the mixing ratio aforementioned, and to be able to realize it stably, and thus development of a technology for that purpose is required.

Patent Document 1: Unexamined Japanese Patent Application Publication No. 2004-28589

Patent Document 2: Unexamined Japanese Patent Application Publication No. 2001-322099

Patent Document 3: Unexamined Japanese Patent Application Publication No. 2004-108285

Patent Document 4: Unexamined Japanese Patent Application Publication No. 2004-270537

SUMMARY

The present invention was developed in view of the above situation and is intended to provide a micro total analysis system for mixing two kinds of fluids at a mixing ratio of m:n without changing drive voltages of micro-pumps for feeding the respective fluids and controlling accurately the mixing ratio. It is an object of this invention that in this system, even if the mixing ratio is widely different from 1:1, a stable mixing ratio of two fluids can be ensured.

DETAILED DESCRIPTION OF THE PREFERRED EMBODIMENTS

Figure 1:
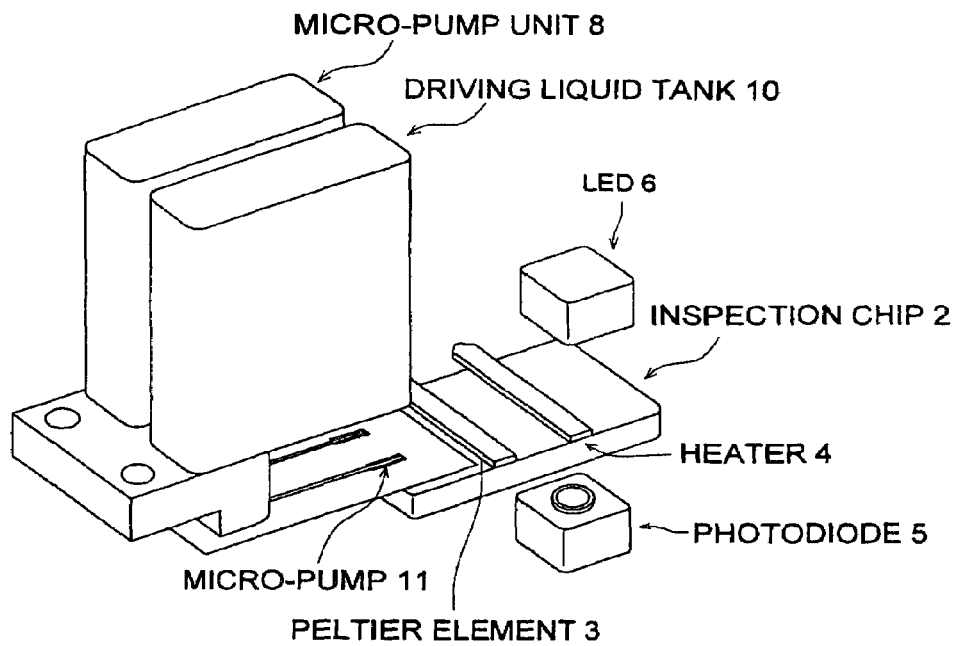
FIG. 1(a) is a drawing showing a schematic constitution of the micro total analysis system of the present invention as an embodiment.
FIG. 1(b) is a drawing viewed from the side thereof.
Figure 1:
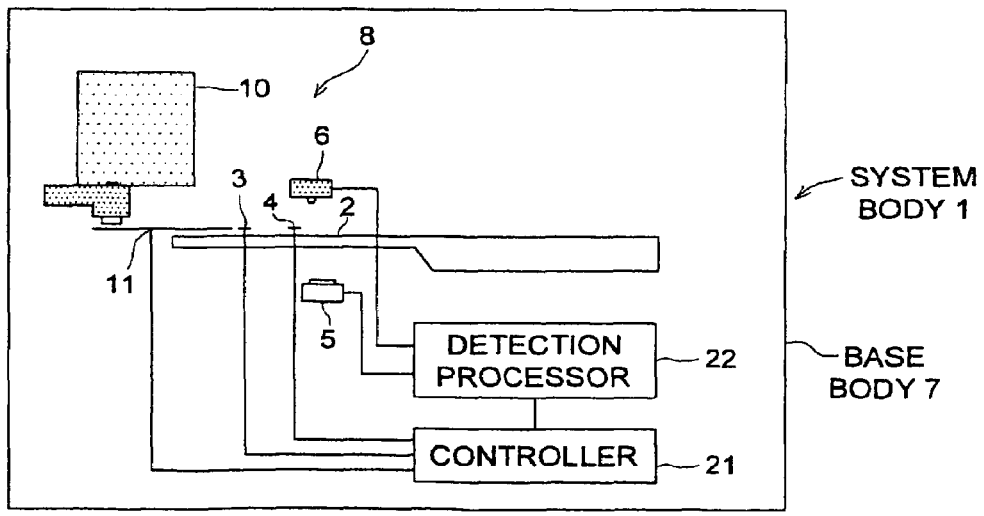

The above object can be accomplished by the following configurations.

The micro total analysis system of the invention includes,
an inspection chip having at least;

a pump connection having a flow path opening for communicating with a micro-pump;
a flow path in which fluid flows; and
a fluid mixing section on which two or more fluids are joined and mixed, and the system further includes
a system body having at least;
a base body;
a chip connection positioned in the base body and having a flow path opening for communicating with the inspection chip;
a micro-pump unit having a plurality of micro-pumps of substantially same shape;
a detection processor;
a controller for controlling at least functions of the micro-pump unit and the detection processor, and when a mixing ratio of the two fluids joining at the fluid mixing section is approximately a ratio of m to n (the ratio is not 1 to 1), a joining amount ratio is adjusted while a driving voltage of each of the plurality of micro-pumps is substantially same as another.

It is desirable that the joining amount ratio is adjusted so that the mixing ratio is substantially m to n by making flow path resistance values of R1+R2 of the flow paths feeding two fluids to be joined (R1 is a flow path resistance value from a micro-pump to a joining point and R2 is an effective internal flow path resistance value of the micro-pump at the driving voltage) different from each other.

It means that a flow path resistance value is adjusted so that a flow rate ratio at a joining point of flow path 31 and flow path 33 which feed two fluids to be joined at the ratio of m to n is defined to be $$\frac{\left(\begin{array}{c}\text{Flow path resistance}\\\text{value of flow path 33}\end{array}\right)+\left(\begin{array}{c}\text{Effective internal flow path}\\\text{resistance value of pump }P2\end{array}\right)}{\left(\begin{array}{c}\text{Flow path resistance}\\\text{value of flow path 31}\end{array}\right)+\left(\begin{array}{c}\text{Effective internal flow path}\\\text{resistance value of pump }P1\end{array}\right)}$$

(pumps feeding two fluids to be joined at the ratio of m to n through flow paths 31 and 33 are pump P1 and pump P2 respectively).

The adjustment of the flow path resistance value can be carried out based on making at least one of sectional area and length of the flow paths feeding two fluids to be joined, different from each other.

The joining amount ratio can be adjusted by varying the number of micro-pumps and flow paths which feed fluids to be joined so that the mixing ratio is approximately m to n.

The flow path in which fluid flows is a fine flow path having micron-size width provided on the inspection chip. It is desirable that the micro-pump is provided on the fine flow path and it has,
a first flow path in which a flow path resistance value varies according to a pressure difference;
a second flow path positioned in the fine flow path, a variation ratio of a flow path resistance value with respect to a variation of a pressure difference in the second flow path being smaller than in the first flow path;
a pressure chamber positioned in the fine flow path and connected with the first flow path and the second flow path;
an actuator for varying internal pressure of the pressure chamber; and
a driving device for driving the actuator.

A target substance in a specimen is analyzed in the inspection chip after the inspection chip is mounted in the base body while the pump connection of the inspection chip keeps close contact with the chip connection of the micro-pump unit liquid-tightly.

A method for controlling of a mixing ratio of two fluids in a micro total analysis system is conducted such that when a mixing ratio of two fluids to be joined at a fluid mixing section is controlled to be approximately a ratio of m to n (the ratio is not 1 to 1), a joining amount ratio is adjusted by making a flow path resistance value of each flow path, in which a fluid flows before joining, different from each other or by varying the number of micro-pumps and flow paths, while driving voltages of the micro-pumps feeding the fluids are substantially equal to each other.

Making a flow path resistance value different from each other is based on making sectional area or length of each of flow paths feeding two fluids to be joined, different from each other.

In the system of the present invention, to mix two kinds of fluids at a mixing ratio of m:n, all the drive voltages of the micro-pumps for feeding respectively the fluids are made always equal to each other to drive the pumps. By doing this, in all the flow paths, the pressures from the inlet port to the joining part are changed while being linked with each other and are kept at the same rate, so that the ratio of joining amounts is always kept at a fixed rate of m:n. Particularly, even if the mixing ratio is extremely different from 1:1, a stable mixing ratio of the two fluids can be ensured.

The present invention provides a micro total analysis system having a simple constitution for realizing stable and highly accurate mixing of a plurality of fluids and making an efficient and rapid analysis.

DETAILED DESCRIPTION OF THE INVENTION

In this specification, "fluid" is an article which is fed from a fluid storage section by the micro-pump and flows through the flow path in the chip and the applicable fluids may be a liquid, a fluid substance, and a gas. An objective fluid is actually often a liquid and specifically, various kinds of reagents, a sample liquid, a modifier liquid, a cleaning liquid, and a driving liquid conform to it. "Fine flow path" is a fine grooved flow path formed in the inspection chip. Even if a reagent storage section, a reaction part, and a detection part are formed in a wide liquid reservoir shape having a large capacity, they may be referred to as a "fine flow path". "Gene" is a DNA or RNA having genetic information for manifesting a certain function, though it may be just referred to as DNA or RNA which is a chemical substance. A target substance to be analyzed may be referred to as an analyte.

Outline of the Micro Total Analysis System of the Present Invention

The micro total analysis system of the present invention comprises:
an inspection chip equipped with at least a pump connection having a flow path opening for interconnecting to the micro-pump, a flow path through which a fluid flows, and a fluid mixing section for joining and mixing two or more fluids and a system body including at least, a base body, a chip connection arranged in the base body and having a flow path opening for interconnecting to the concerned inspection chip and a micro-pump unit having a plurality of micro-pumps in substantially the same shape, a detection processor, and a controller for controlling at least the function of the micro-pump unit and the function of the detection processor, and while being set the mixing ratio of two fluids to be joined in the fluid mixing section to a rate of approximately m:n (not 1:1), the ratio of joining amounts is adjusted by making the drive voltages of the micro-pumps substantially equal to each other.

Hereinafter, the embodiment of the present invention will be explained with reference to the accompanying drawings 1 to 8. FIGS. 1(a) and 1(b) are conceptual diagrams showing the constitution of an embodiment of the micro total analysis system of the present invention. In this embodiment, as shown in the drawing, there is a system body 1 including an inspection chip 2, and as a device for storing the chip, a heating-cooling unit (a Peltier element 3, a heater 4) for reaction, a micro-pump unit having a liquid feeding micro-pump 11, a driving liquid tank 10, and a chip connection. Further the system body 1 includes controller (not drawn) relating to each control for liquid feeding, temperature, and reaction, and an optical detection system (an LED 6, a photodiode 5, or the like), and also has a detection processor (not drawn) for performing data collection (measurement) and processing.

The inspection chip 2 is generally equal to a one referred to as an analytical chip or a micro-reactor chip. The inspection chip uses, for example, resin, glass, silicon, or ceramics as a material and forms a fine flow path having micro-order dimensions of a width and a thickness of about 10 μm to several hundreds μm by a fine processing technology. The length and width thereof are generally several tens mm and several mm respectively.

In the chip aforementioned, liquids in various kinds of storage sections such as various reagent storage sections and specimen storage sections are fed by the micro-pump 11 aforementioned interconnected to the storage sections by a pump connection 12 having a flow path opening for interconnecting to the micro-pump.

The components other than the inspection chip 2 are united in the system body 1 and it is desirable to structure so as to arrange the chip 2 attachable to and detachable from the system body. Further, as a micro-pump 11, generally, a plurality of micro-pumps having substantially the same shape are incorporated into the system body. The micro-pump unit including the plurality of micro-pumps and the chip connection having the flow path opening for interconnecting to the inspection chip is arranged inside the base body of the system body of the present invention. As shown in the drawing, the chip 2 is mounted on the system body with the surfaces coming in contact with each other, thus the pump connection of the chip 2 is connected to the port of the chip connection of the micro-pump unit of the system body.

The device of electric control system for controlling the micro-pump 11 sets a target value of the flow rate and supplies a drive voltage according to the value to the micro-pump. The controller for executing such control, as described later, may be incorporated into the system body of the present invention and may execute operation control when the pump connection of the inspection chip is connected to the chip connection of the micro-pump unit of the system body.

The detection processor 22 which is a unit for executing optical detection and data collection and processing, for example, when a method such as a visible spectroscopic method or a fluorescent photometry is applied, is not particularly restricted as an optical measuring means, though it is desirable to properly install an LED, a photomultiplier, a photodiode, and a CCD camera in the system body as components thereof.

The controller controlling at least the function of the micro-pump unit 8 and the function of the detection processor 22 is incorporated in the system body 1 of the present invention. The controller 21, furthermore, may control comprehensively the system including temperature control and measured data recording and processing. In the controller 21 in this case, conditions set beforehand in relation to the order, capacity, and timing of feeding liquids are incorporated in the software loaded in the micro total analysis system together with control for the micro-pump and temperature as contents of the program. A series of analytical steps of the pretreatment of specimens which are samples to be measured, reaction, and detection is executed when a chip is mounted in the system body 1 where the micro-pump 11, detection processor 22, and controller 21 are united. A sample is injected into the mounted chip or the chip where the sample has been injected is mounted on the system body 1, and then the analysis may be started. It is a desired configuration that feeding samples and reagents, pretreatment, predetermined reaction based on mixing, and optical measurement are automatically executed as a series of continuous steps and measured data are stored in a file together with necessary conditions and recorded matters.

Fluid Storage Section

On the inspection chip 2, as a fluid storage section, a sample storage section for storing a sample liquid and also a plurality of reagent storage sections for storing various reagents are installed. In the reagent storage sections, reagents, a cleaning liquid, and a modifier liquid which are used for the predetermined reaction are stored.

In the reagent storage sections, it is desirable that to realize quick inspection regardless of location and time, reagents are stored beforehand. To prevent reagents built in the chip from evaporation, leakage, mixture of bubbles, contamination, and degeneration, the surface of each of the reagent storage sections is sealed.

Micro-Pump

Figure 2A:
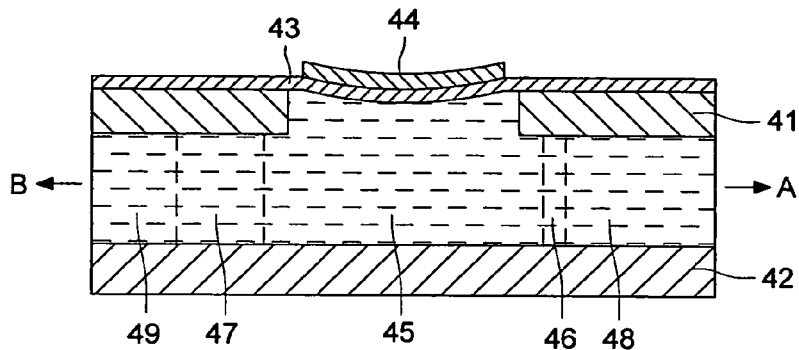
FIG. 2(a) is a cross sectional view showing an example of a piezo-electric pump and Fig.
Figure 2B:
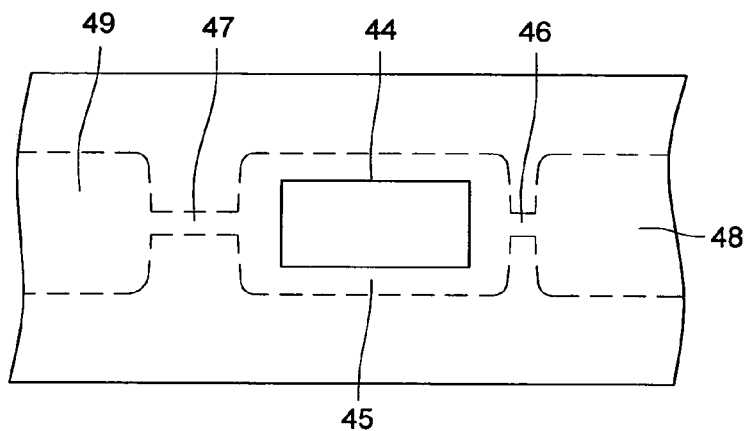
FIG. 2(b) is a top view thereof.

Though various types of pumps including a check-valve-type pump in which a check valve is provided at a flow-in and flow-out port of a valve chamber provided with an actuator can be used as micro-pump, it is preferable that a piezoelectric pump is used. FIG. 2(a) is a cross-sectional view showing an example of a piezoelectric pump and FIG. 2(b) is a top view of the piezoelectric pump. On this micro-pump, there are provided substrate 42 on which first liquid chamber 48, first flow path 46, pressure chamber 45, second flow path 47 and second liquid chamber 49 are formed, upper substrate 41 laminated on the substrate 42, vibration plate 43 laminated on the upper substrate 41, piezoelectric element 44 laminated on the side facing the pressure chamber 45 of the vibration plate 43 and a driving section (not shown) for driving the piezoelectric element 44. This driving section and two electrodes on piezoelectric element 44 are connected with a wiring such as a flexible cable and structured so as to apply voltage having special waveform to piezoelectric element 44 by the driving circuit of the driving section through the connection.

In this example, photosensitive glass substrate having a thickness of 500 μm is used as substrate 42, and first liquid chamber 48, first flow path 46, pressure chamber 45, second flow path 47 and second liquid chamber 49 are formed by conducting etching to the depth of 100 μm. The width of the first flow path 46 is 25 μm and the length is 20 μm. The width of the second flow path 47 is 25 μm and the length is 150 μm.

A top face on each of the first liquid chamber 48, first flow path 46, second liquid chamber 49 and second flow path 47 is formed by laminating the upper substrate 41 of a glass substrate on the substrate 42. A portion on pressure chamber 45, corresponding to the top of the pressure chamber 45 is processed by means of etching to become a through hole.

On the top surface of the upper substrate 41, there is laminated vibration plate 43 composed of a 50 μm-thick thin sheet glass, and piezoelectric element 44 composed of a 50 μm-thick lead titanate zirconate (PZT) ceramics is laminated on the vibration plate 43.

The piezoelectric element 44 and the vibration plate 43 attached on the piezoelectric element 44 are vibrated by driving voltage coming from a driving section, and thereby a volume of the pressure chamber 45 is increased or decreased. The first flow path 46 and the second flow path 47 are the same in terms of a width and a depth, and a length of the second flow path is longer than that of the first flow path, and when the pressure difference grows greater in the first flow path 46, an eddy flow is generated to flow in whirls in the flow path, and flow path resistance is increased. On the other hand, in the second flow path 47, even when the pressure difference grows greater, a laminar flow still stays because a flow path length is greater, thus, a rate of change of flow path resistance for a change of pressure change is small, compared with the first flow path.

For example, when vibration plate 43 is moved quickly toward the inside of the pressure chamber 45 by driving voltage for the piezoelectric element 44 to reduce a volume of the pressure chamber 45 while giving a large pressure difference, and then, when vibration plate 43 is moved slowly toward the outside of the pressure chamber 45 while giving a small pressure difference to increase a volume of the pressure chamber 45, a liquid is fed in the direction B in the same drawing. On the contrary, when vibration plate 43 is moved quickly toward the outside of the pressure chamber 45 to increase a volume of the pressure chamber 45 while giving a large pressure difference, and then, when vibration plate 43 is moved slowly toward the inside of the pressure chamber 45 while giving a small pressure difference to reduce a volume of the pressure chamber 45, a liquid is fed in the direction A in the same drawing.

Meanwhile, a difference of a rate of change of flow path resistance for a change of pressure difference between the first flow path and the second flow path does not need to be caused by a difference of a flow path length, and it may also be one based on another difference in shapes.

In the piezoelectric pump structured as in the foregoing, a direction for feeding a liquid and a liquid-feeding speed can be controlled to desired values by changing driving voltage and frequency for the pump. Although it is not illustrated in FIGS. 2(*a*) and 2(*b*), port 72 connecting to driving liquid tank 10 is installed in the first liquid chamber 48 and port 73 connecting to the pump connection is installed in the second liquid chamber 49.

Figure 2C:
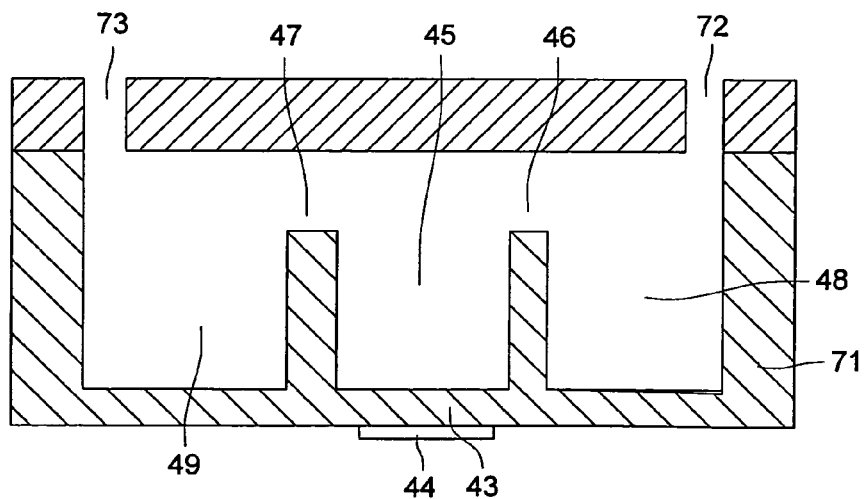
FIG. 2(c) is a cross sectional view showing another example of the piezo-electric pump.

Another example of the pump is shown in FIG. 2(*c*). In this example, the pump is composed of silicon substrate 71, piezoelectric element 44 and an un-illustrated flexible wiring. The silicon substrate 71 is one wherein a silicon wafer is processed by photolithography technologies to be in a prescribed shape, and pressure chamber 45, vibration plate 43, first flow path 46, first liquid chamber 48, second flow path 47 and second liquid chamber 49 are formed on the silicon substrate 71 by means of etching. On the first liquid chamber 48, there is formed port 72, and on the second liquid chamber 49, there is formed port 73, and when this piezoelectric pump is provided to be separate from chip 2 in FIGS. 1(*a*) and 1(*b*), for example, the piezoelectric pump is made to be communicated with a portion for the pump connection 12 on the chip 2 through the ports 73. For example, the pump can be connected with the chip 2 by superposing substrate 74 on which ports 72 and 73 are formed and the vicinity of a portion for the pump connection on the inspection chip vertically. Further, as stated above, it is also possible to form plural pumps on a single silicon substrate. In this case, it is preferable that a driving liquid tank 10 is connected with the port which is on the opposite side of the port connected with the chip 2. When there are plural pumps, ports of these pumps may also be connected to a common driving liquid tank.

The relationship between the micro-pump aforementioned and the system of the present invention shown in FIGS. 1(*a*) and 1(*b*) will be explained below. In the example shown in FIGS. 1(*a*) and 1(*b*), the micro-pump belongs to the system body as a separate device from the inspection chip 2 and is interconnected to the driving liquid tank. The micro-pump, when the micro-pump and the inspection chip 2 are joined to each other in respective predetermined configurations, is connected to the pump connection 12 on the inspection chip and is interconnected to the flow path of the inspection chip.

In FIG. 2, a port 72 is installed in a first liquid chamber 48 and the first liquid chamber plays a role of a "reservoir" and is fed a driving liquid from the driving liquid tank 10 via the port 72. A port 73 is installed in a second liquid chamber 49. The second liquid chamber forms a flow path of the micro-pump unit, and the port 73 is positioned ahead the flow path, and the flow path is connected to "the pump connection" 12 of the inspection chip.

Figure 3:
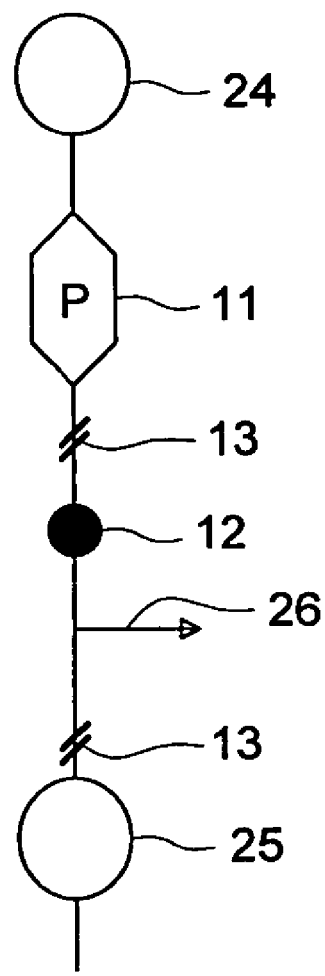
FIG. 3 is a drawing showing the constitution of a chip in the periphery of the pump connection when the piezo-electric pump is installed separately from the chip.
Figure 3:
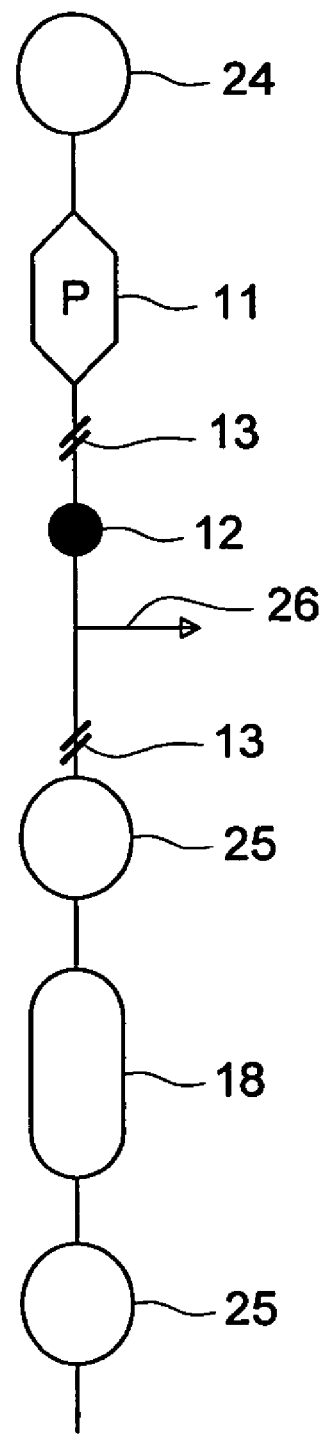

FIG. 3 shows a configuration in the vicinity of the pump connection of chip 2 in the case where piezoelectric pump as a micro-pump is separated from inspection chip 2 in FIGS. 1(*a*) and 1(*b*). In this figure, the downstream flow path from pump connection 12 where fluid delivery port of micro-pump is connected to the inspection chip flow path is provided on the inspection chip. FIG. 3(*a*) shows the structure of the pump portion that feeds driving liquid and FIG. 3(*b*) shows the structure of the pump portion that feeds a reagent. In this case, the numeral 24 represents a storage section for a driving liquid and corresponds to the driving liquid tank in FIGS. 1(*a*) and 1(*b*). The driving liquid may be either oil system such as a mineral oil or water system. The numeral 25 represents a storage section for a sealing liquid. This sealing liquid is one for preventing that a reagent leaks out to a fine flow path to react. Further, the sealing liquid may be filled either in the fine flow path or in a reservoir section provided for the sealing liquid.

Micro-pumps can be incorporated in the chips. Especially when the flow path is relatively simple and for the purpose or usage based on repeated use of the chips for chemical synthesis reaction for example, the above structure can be employed.

Inspection Chip

Inspection chip 2 is used for chemical analysis, various kinds of inspections, process or separation of samples, or chemical synthesis as a micro-reactor. As the basic structure of the chip of the invention, it is manufactured by adequately combining one or more forming material including for example, resin, glass or silicon. It is a chip type micro reactor in which a main body is constructed by at least two substrates. The preferred structure is a structure in which, a pump connection, a valve base and a fluid reservoir (such as a reagent storage section, a specimen storage section and a waste liquid retainer) are formed as structural members by using a channel-formed substrate and a covering substrate as a basic structure, fine flow paths are formed at least on the cannel-formed substrate, and at least these structural members, the fine flow path and the detecting section on the cannel formed substrate or at least the detecting section are covered by a light transmitting covering substrate that is brought into close contact with the fine flow path.

As the material of chip, various forming materials as above can be available in accordance with the character of each material. In the inspection chip used for the system of the invention, the flow path, the element of flow path and the body are formed by resins, which are suitable for mass production, and are light in weight, robust against impact, and are easy to be disposed by incineration, so as to make the chip to be of a disposable type, which is easy to produce. The resins used are preferably desired to have good character in workability, anti-water absorbing property, chemical resistance property, heat resistance property and inexpensiveness.

For the substrate such as channel-formed substrate where flow path is formed, a resin having water repellency and hydrophobicity in which the flow path hardly distorts by absorbing water and infinitesimal amount of specimen fluid can be fed without wasting in the way is preferred. For these materials, Resin, such as polystyrene, polyethylene, polypropylene, a polyethylene terephthalate, polyethylenenaphthalate, polyethylene vinyl alcohol, polycarbonate, poly methyl pentene, fluorocarbon, and saturation annular polyolefin. In case it is needed to be heated up to around 100° C. due to the requirement of analysis, the material needs to be replaced with a material superior in heat resistance. For such materials, plastics such as polycarbonate, polyimide, polyether imide, poly Benz imidazole, polyetheretherketone are named as examples. To detect fluorescent matters or products of color reaction optically, the detecting portion which covers at lease the detecting section of the fine flow path on the micro reactor surface needs to be a member with light transmissive state. Therefore, for the light transmissive covering substrate, transparent materials as alkali glass, quartz glass and transparent plastics can be used. The covering substrate as a transparent substrate, is adhered on the channel-formed substrate so that it is formed to cover at least these structural section, the flow path and detecting section.

Flow Path

The flow path of the inspection chip as the micro reactor is formed on the substrate in accordance with allocation of the flow path designed in advance for the purpose. The flow path where a liquid flows is a fine flow path formed to have width and depth of several tens to several hundreds μm, preferably a width of 50 to 200 μm, a depth of 25 to 300 μm. If the width of flow path is less than 50 μm, flow path resistance increases and it is inconvenient for fluid feeding and detection. In the flow path with a width exceeding 500 μm, the merits of the micro scale space is reduced. The forming method is based on existing micro work technologies. Typically, transferring of micro structure using photosensitive resin through photolithography technology is preferred. Using the transfer structure, elimination of unnecessary part, adding of necessary parts and transferring of shape are carried out. After making a pattern, which forms the constructive elements of the chip by photolithography technology, the pattern is transformed onto a resin. Therefore, for the material of basic substrate, which forms the fine flow path of the micro reactor, a resin that can transfer sub-micron structure accurately and is superior in mechanical character is preferably used. Polystyrene and polydimethylsiloxane are superior in shape transferring. Injection molding and extrusion can be utilized.

In a micro space, a flow path with a hydrophobic inner surface is preferable for controlling fluid motion to stop or slow the flow. Thus, if water repelling resin is used for the substrate forming the micro flow path, coating on the inside of the flow path is not particularly necessary. If particularly necessary, fluorine based polymer coating may be applied (for example, Unexamined Japanese Patent Document 2004-75780).

Mixture of a Plurality of Fluids

When fluids flowing through a plurality of fine flow paths are collected, joined, and mixed in the fluid mixing section, the mixing ratio thereof is not always 1:1 and is often changed variously as required. Joining and mixing of two kinds of fluids specifically conform to mixing of a reagent and a reagent, or mixing of a specimen and a reagent in the flow path. For example, when mixing a specimen liquid and a reaction reagent, the volume of the latter is often larger. When mixing two fluids at a mixing ratio of 1:1, if the micro-pumps for feeding the respective fluids are of a same type and the drive voltages and resistances of the flow paths through which the fluids flow are substantially equal, the two fluids may be joined at a rate of 1:1. However, when the mixing ratio of the two fluids is deviated from 1:1, the problem aforementioned arises. In the analysis system using the micro-reactor chip, not only it is necessary to feed small amounts of fluids with high precision but also it is required to mix sufficiently them in a short time and obtain a stable mixing ratio. When mixing two kinds of fluids at a high mixing ratio of m:n (m:n is not 1:1), there is a method available for changing the drive voltages of the micro-pumps for feeding the respective fluids, thereby changing the generated pressures of the pumps, adjusting the feeding flow rates of the fluids, thus controlling the mixing ratio. In this method, there exists the problem described in the item of "Background of the invention". When mixing two fluids, unless an accurate mixing ratio is established stably, the analytical accuracy is affected adversely. To obtain an accurate mixing ratio, it is necessary to examine from the side of precise fluid flow rate control and the side of mixing method. As an example, a method for measuring the flow rate using a flow rate sensor and executing feedback control on the basis of measured values may be considered, but the sensor and control circuit complicate the system more and eventually make it disadvantageous in cost.

The micro total analysis system of the present invention controls the mixing ratio stably using the following constitution. Namely, in the case of setting the mixing ratio of two fluids to be joined in the fluid mixing section to a rate of about m:n (m:n is not 1:1), the amount ratio of joining is adjusted by controlling all the drive voltages of the micro-pumps in approximately the same shape to be substantially equal to one another.

The generated pressure P of each of the micro-pumps is almost proportional to the drive voltage supplied to the pump. Using the generated pressure P of the micro-pump and assuming the flow rate of a fluid fed by each pump as Q and the effective internal flow path resistance of the micro-pump at the concerned drive voltage as $R_2$, the following formula is held.

$$P = R_2 \times Q \qquad (1)$$

Further, Formula (1) corresponds to a case that no external load is applied to the micro-pump. When a flow path for applying a load to the pump is connected, even though the pump has the same pressure P, the flow rate Q is reduced by a one corresponding to the concerned external load. Here, the "effective internal flow path resistance of the micro-pump at the concerned drive voltage" means a fluid resistance held independently by the micro-pump itself and when there is no external load applied to the micro-pump, it can be obtained from Formula (1) by measuring the generated pressure P of the pump and flow rate Q. The reason for "at the concerned drive voltage" is that the micro-pump operates on the principle of use of the nonlinearly of the flow path resistance, so that when the drive voltage is changed, the internal flow path resistance is also changed. However, the variation thereof is not so large as affecting the principle of the present invention. Similarly, the reason for "effective" is that in the micropumps, it is considered that the relationship between P and Q is slightly varied from the proportional relationship.

When setting the mixing ratio of two fluids to be joined in the fluid mixing section to a rate of about m:n (m:n is not 1:1), according to the present invention, a plurality of micro-pumps in substantially the same shape are used, and the drive voltages of the micro-pumps are made substantially equal to each other, and the joining amount ratio of the two fluids to be joined is adjusted to about m:n. "About m:n" means not only accurately m:n but also a range of variation within the tolerance of measurement. For the aforementioned adjustment, concretely, any of the following measures can be adopted.

The first method is a method for changing, so as to set the mixing ratio to about m:n, the respective flow path resistances $R_1+R_2$ ($R_1$ indicates a flow path resistance between the micro-pump and the junction, and $R_2$ indicates an effective internal flow path resistance of the micro-pump at the concerned drive voltage) of the flow paths for feeding two fluids to be joined and adjusting the amount ratio of joining. Namely, it is a method for changing the flow path resistances so as to set the ratio between the values $R_1+R_2$ of the concerned two fluids to about m:n. Actually, it is desired for the reason of manufacture to form the micro-pumps in the same shape, so that the values of $R_2$ are almost the same, thus $R_1$ is mainly used for the aforementioned adjustment. When the flow path resistance is adjusted like this and the micro-pumps are driven at approximately the same drive voltage, the mixing ratio of the concerned two fluids is set to about m:n.

When the micro-pumps are driven at substantially the same drive voltage, if the values $R_1+R_2$ are not the same, the two fluids to be joined are different in the flow rate per unit time and the fluid amounts entering the junction are not made equally after all. For example, it is desirable to control the flow path resistance $R_1+R_2$ of the flow path through which a fluid having a low flow rate flows to be higher than the flow path resistance $R_1+R_2$ of the flow path through which a fluid having a high flow rate flows.

where $\eta$ indicates viscosity, S indicates a sectional area, $\phi$ indicates an equivalent diameter, and L indicates a flow path length.

Further, the equivalent diameter $\phi$, in a rectangular section with a width of "a" and a height of "b", satisfies an equation of $\phi=(a\times b)/[(a+b)/2]$.

FIG. 5 is a drawing showing an example of the flow path constitution for mixing two fluids. As shown in the drawing, a fluid A fed by the micro-pump 11 (not illustrated) for joining from a flow path 31 and a fluid B fed by the micro-pump 11 from another fluid storage section for joining from a flow path 33 are joined at the joining part of the Y-shaped junction and are fed out to a subsequent flow path 15. In FIG. 5(a), assuming the pump for feeding the fluid A as $P_1$ and the pump for feeding the fluid B as $P_2$, when the ratio of flow rates per unit time $Q_1/Q_2$ at the junction of the two fluids is a rate of m:n (m:n is not 1:1), the mixing ratio of the two fluids should be m:n. If the viscosity of the two fluids are almost the same and the sectional areas of the flow paths 31 and 33 made of the same material are also the same, it is possible to regard the flow path resistances $R_1$ of these flow paths (the flow path resistance from the micro-pump to the junction) as the same. At the start of confluence of the two fluids, in the downstream side flow path 15 where the fluids flow after confluence, no fluids have not been filled up and the flow rate ratio aforementioned becomes equal to the ratio of the generated pressures of the pumps $P_1$ and $P_2$, in other words, the drive voltage ratio of the piezoelectric elements of the pumps. However, according to the present invention, in place of changing the drive voltages of the micro-pumps, the flow rates of the two fluids to be joined per unit time are adjusted on the upstream side of the junction, thus the mixing ratio is controlled to about m:n. To realize it, as mentioned above, it is desirable to change and adjust the flow path resistances $R_1$ of the flow paths from the respective pumps to the junction. The flow rate ratio is proportional as shown below from Formula (2).

$$\frac{\begin{pmatrix}\text{Flow path resistance}\\\text{value of flow path 33}\end{pmatrix}+\begin{pmatrix}\text{Effective internal flow path}\\\text{resistance value of pump }P_2\end{pmatrix}}{\begin{pmatrix}\text{Flow path resistance}\\\text{value of flow path 31}\end{pmatrix}+\begin{pmatrix}\text{Effective internal flow path}\\\text{resistance value of pump }P_1\end{pmatrix}} \quad \text{Formula 2}$$

Here, the "flow path resistance" of the flow path is equivalent to the coefficient of pressure loss when a fluid flows through the flow path. Using the volume of the fluid flowing through the flow path in a unit time, which is the flow rate Q, and assuming the pressure loss due to flowing of the fluid through the flow path as $\Delta P$, the flow path resistance R [N·s/m^5] is obtained from the formula indicated below. Here, N indicates force (Newton) and s indicates time (second).

$$R=\Delta P/Q \quad (2)$$

The value of flow path resistance can be obtained by measuring the flow rate when applying pressure to the entrance of the flow path to allow a fluid to flow and dividing the pressure by the flow rate.

Particularly, like the flow path of the present invention, if the flow path is narrow and long and a laminar flow is dominant in the flow path, the value of flow path resistance R can be calculated by the following formula.

$$\text{Flow path resistance: } R=\int [32\times\eta/(S\times\phi^2)]dL \quad (3)$$

Therefore, assuming the flow path resistance of the flow path 31 as R, when m>n and Q1>Q2, it is necessary to make the flow path resistance of the flow path 33 larger than R and it is assumed as R+$\Delta$R.

Actually, when the two fluids flow increasingly into the junction at a flow rate ratio of m:n, in the downstream side flow path 15, the two fluids are filled up keeping the mixing ratio m:n and the flow path resistance $R_{15}$ is increased slowly in correspondence to it. Therefore, the flow path resistance $R_{15}$ of the downstream side flow path 15 is 0 at the start of confluence, but it is changed with time after confluence, thus the pressure loss of the pump is also changed. But the amount thereof can be predicted by the total liquid amount fed from the two pumps.

The flow rate of the mixed fluids which were joined is lowered due to an increase in the flow path resistance after confluence, so that when the drive voltages supplied to the piezoelectric elements are kept constant, the flow rate fed to the flow path 15 cannot be made constant. However, when the drive voltages of the two pumps are almost the same, the flow path resistance of the flow path on the downstream side of the mixing section and capillary force are changed and even if the flow rates are changed with time, the flow rate ratio of the two fluids is always kept at m:n. As long as all the micro-pumps for feeding the fluids to be joined are driven always at the same drive voltage, in every flow path, the pressure differences from the inlet port to the joining part are interlocked with each other and the pressures are always changed with time at the same rate. Namely, when the pressures are interlocked with each other, if the pumps are just driven always at the same drive voltage, the pressures are changed with time keeping the same ratio, so that the flow rate ratio is always kept constant. Further, to keep not only the flow rate ratio but also the flow rates constant, by keeping the drive voltages of the two pumps in a relationship of being almost the same, the pressures may be changed with time.

In the relationship between a flow path and a fluid in the micrometer dimension level, in the behavior of the fluid, the viscosity force is more dominant than the inertia force. Therefore, the relationship between the generated pressure of the pump and the flow rate approaches a linear relationship and is adapted better to the relationships of Formulas (2) and (3) indicated above. As the flow path becomes narrower, the Reynolds number (density×velocity×representative size÷viscosity) which is a dimensionless parameter indicating the ratio of viscosity force to inertial force is reduced. For example, in a range of a width of 1 mm or less, this effect is great. From the Reynolds number, whether the flow of a fluid is a laminar flow or not can be inferred. When the Reynolds number is 2000 or less, it is generally a laminar flow.

Formula (3) indicated above shows that the flow path resistance R is inversely proportional to $S \times \phi^2$ of the flow path. Namely, when the flow path becomes narrower, the resistance at time of feeding a fluid is increased directly, thus the flow rate of the fluid which can be fed is lowered. Therefore, as a preferable method for changing the flow path resistance, it is desirable to make the sectional areas or the inner diameters of flow paths, for feeding two fluids to be joined, different from each other. In the method aforementioned, the flow path sectional areas can be easily made wider or narrower. The part of the flow path through which the fluid flows to be made narrower to reduce the flow rate is any section between the feeding position by the micro-pump and the spot close to the joining point, but the length and position thereof are set on the basis of the kind of a fluid, the flow rate thereof, and the generated pressure of the micro-pump (FIG. 5(b)). Or, the flow paths for feeding the two fluids to be joined may be changed in length, to change the flow path resistances (FIG. 5(c)). Formula (3) shows that R is obtained by integration of length, thus it is obvious that as the flow path increases in length, R increases.

The aforementioned method is considered beforehand on the design stage of a fine flow path and is materialized in manufacture, but it can be hardly changed after formation of the fine flow path. As another method for eliminating this inconvenience, so as to set the mixing ratio to about m:n, it is possible to increase or decrease the number of micro-pumps to be used for feeding fluids to be joined and the number of flow paths, thereby adjust the amount ratio of joining. For example, a configuration may be used that for a fluid required to increase the flow rate, two or more flow paths are used instead of one, and micro-pumps are arranged in the respective flow paths, thus the flow rate of the concerned fluid is increased relatively (FIG. 5(d)). In this aspect, even if two fluids are joined at the junction, the numbers of flow paths through which the fluids have flowed are not the same. One micro-pump takes charge of feeding the fluid in each flow path, so that a plurality of pumps are connected side by side. Unexamined Japanese Patent Application Publication 2004-169706 discloses a fluid transport system in which a plurality of micro-pumps are connected side by side for systematization to increase the flow rate and generated pressure. This system presents various means for increasing the system generated pressure, preventing a plurality of micro-pumps from mutual interference, and improving the characteristics by using mutual pressure waves and may be applied to the aforementioned aspect.

Figure 4:
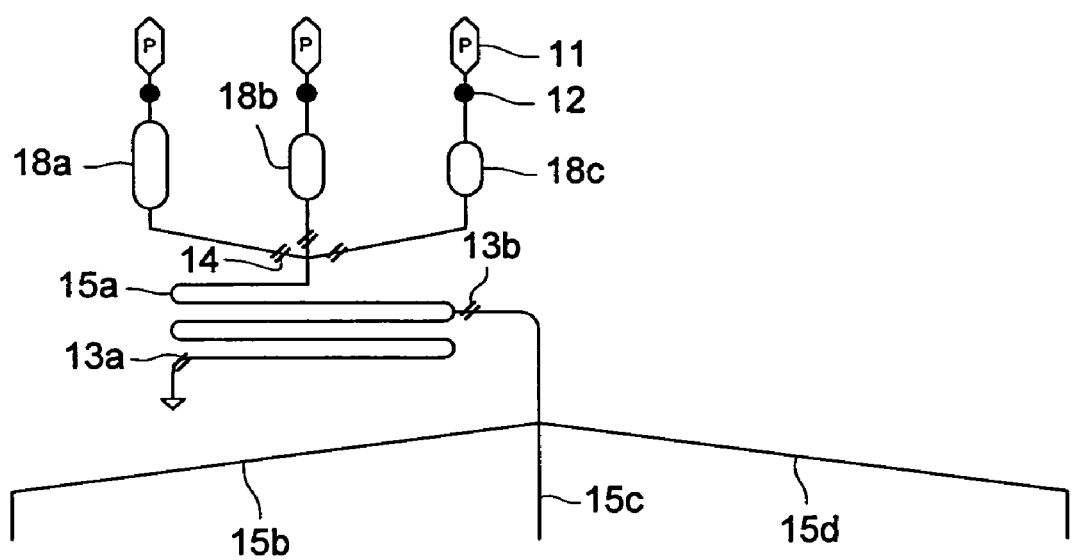
FIG. 4 is a drawing showing an example of the flow path constitution for executing confluence and mixture of three fluids.
Figure 5A:
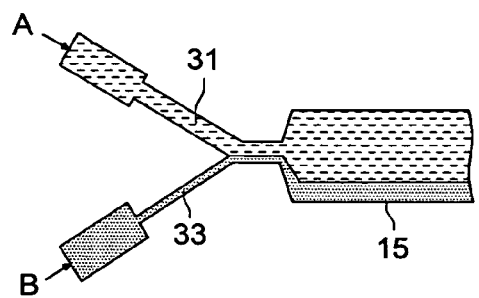
FIGS. 5(a) and 5(b) are drawings showing the situation when two fluids are fed and joined from the upstream sides of the Y-shaped branch paths.
Figure 5B:
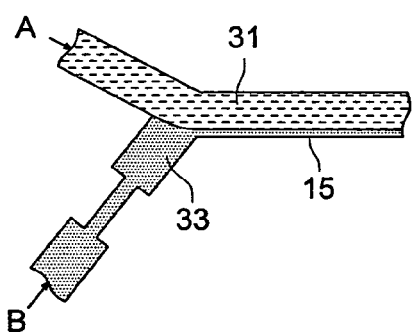
Figure 5C:
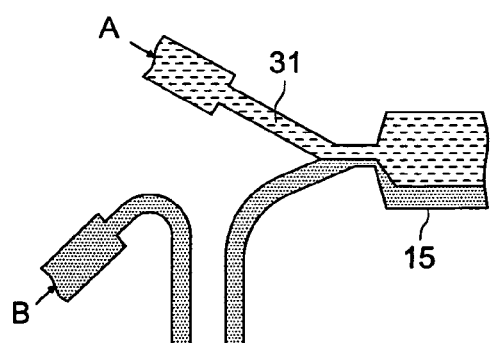
FIG. 5(c) is a drawing showing the driving situation of the micro-pump shown in Fig. (b).
Figure 5D:
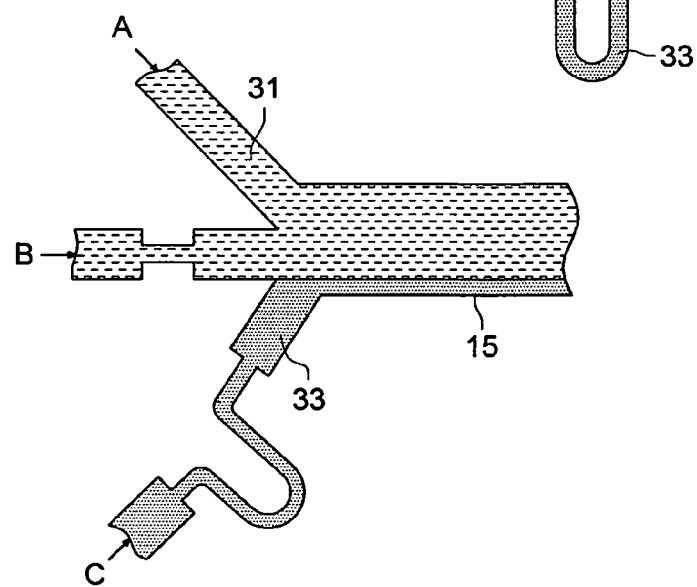

In the system of the present invention, with respect to the mixing ratio m:n of two fluids, when the ratio of m to n is high, for example, when it is widely different from 1:1 like 1:3 or 5:1, the effectiveness thereof is fulfilled. Namely, when the ratio of m to n is high, if it is intended to lower the drive voltage of one micro-pump, thereby realize such a ratio, the joining ratio becomes unstable thus the mixing ratio is varied. It happens due to the change with time of the flow path resistance in correspondence with that the downstream side flow path through which the fluids flow after mixing is slowly filled with the mixed fluids and due to the change in the capillary force. Further, when the drive voltage is lowered, due to the feeding characteristic of the micro-pump used, accurate adjustment of feeding becomes more difficult. Particularly, the valveless pump used in the present invention, since the force of the pump operated at a low voltage is minute, is easily affected by the force of the pump operated at a high voltage. Particularly, as $R_{15}$ (t) is increased, the effect is increased. When the two pumps are driven at the same voltage as in the present invention, the aforementioned problem can be avoided. Further, the mixing ratio m:n aforementioned is a mixing ratio of two kinds of fluids to be joined and mixed. However, for example, as shown in FIG. 4, even if three or more fluids are joined and mixed, the mixing ratio of the fluids and the aspect for realizing it may be considered as a combination of the cases of two fluids aforementioned. One of the fluids is fixed and respective mixing ratios of the concerned fluid and other fluids, that is, the relationship of the two fluids may be considered.

Furthermore, the control method for the mixing ratio of two fluids according to the present invention, in the micro total analysis system, in the case of setting the mixing ratio of two fluids to be joined at the fluid mixing section to a rate of about m:n (m:n is not 1:1), is to change the flow path resistances of the flow paths through which the fluids flow before joining, or to increase or decrease the number of micro-pumps used to feed the fluids and the number of flow paths, thereby to adjust the joining amount ratio while making the drive voltages of the micro-pumps for feeding the fluids substantially equal to each other.

The changing of the flow path resistances aforementioned is based on the changing of the sectional areas or lengths of the flow paths through which the two fluids to be joined are fed.

Fluid Mixing Section

FIG. 5 is a drawing showing an example of the flow path constitution for mixing two fluids. As shown in FIG. 5(a), the two fluids flowing through the two flow paths different in the flow path diameter up to the junction enter and join at the junction at a ratio of m:n per unit time. And, as mentioned above, the fluids are mixed finally at the ratio m:n. In this case, from the junction, flow of two layers having widths at this rate is formed. A method for allowing a plurality of fluids to flow in a laminar flow shape at a fixed width ratio in the flow path 15 with a micrometer order width is often used for diffusing and mixing liquid medicines at a fixed mixing ratio, for example, in a micro reactor. By this method, since the specific interfacial area (the ratio of the area of inter-liquid interface to the liquid volume) is large and the diffusion distance is short, small amounts of liquids can be quantitatively mixed in a comparatively short time. For example, when a fluid A and a fluid B are fed through a flow path with a diameter of 100 μm to the flow path 15 at a fixed ratio of 2:1, as shown in FIG. 5(a), a layer of the fluid A with a width of about 60 μm and a layer of the fluid B with a width of about 30 μm are formed and in a little while, they are naturally diffused and mixed.

When feeding the fluids from a plurality of branch flow paths to the mixing flow path like this, by feeding each fluid in the corresponding branch flow path so as to obtain a flow rate according to the mixing ratio, the fluids can be mixed quickly and the fluids can be mixed at a desired ratio.

The two fluids are joined into the flow path 15 respectively at a predetermined flow rate, and then it is possible, for example, to drive the micro-pump for feeding the fluid A by repeatedly switching the feeding direction to the forward direction or the backward direction and move the two fluids joined in the flow path 15 back and forth in the flow path 15, thereby promote mixing. For example, when the flow path 15 has a width of 0.2 mm and a depth of 0.2 mm and the liquid amount is 25 μl, it is possible to allow the fluids to move back and forth with an amplitude of 25 mm and in a cycle of about 5 seconds. By this alternating motion, the two fluids in the flow path 15 are diffused and mixed actively.

Further, the flow path 33 on the side of the fluid B is equipped with a valve such as a check valve or an active valve, and during mixing, it is closed, and the two fluids joined in the flow path 15 move back and forth by the micro-pump for feeding the fluid A, thus there is no need to arrange a separate micro-pump for mixing in the flow path. For this micro-pump, the piezo-electric pump shown in FIG. 2 is suitable.

Accurate Mixing Ratio

Figure 6:
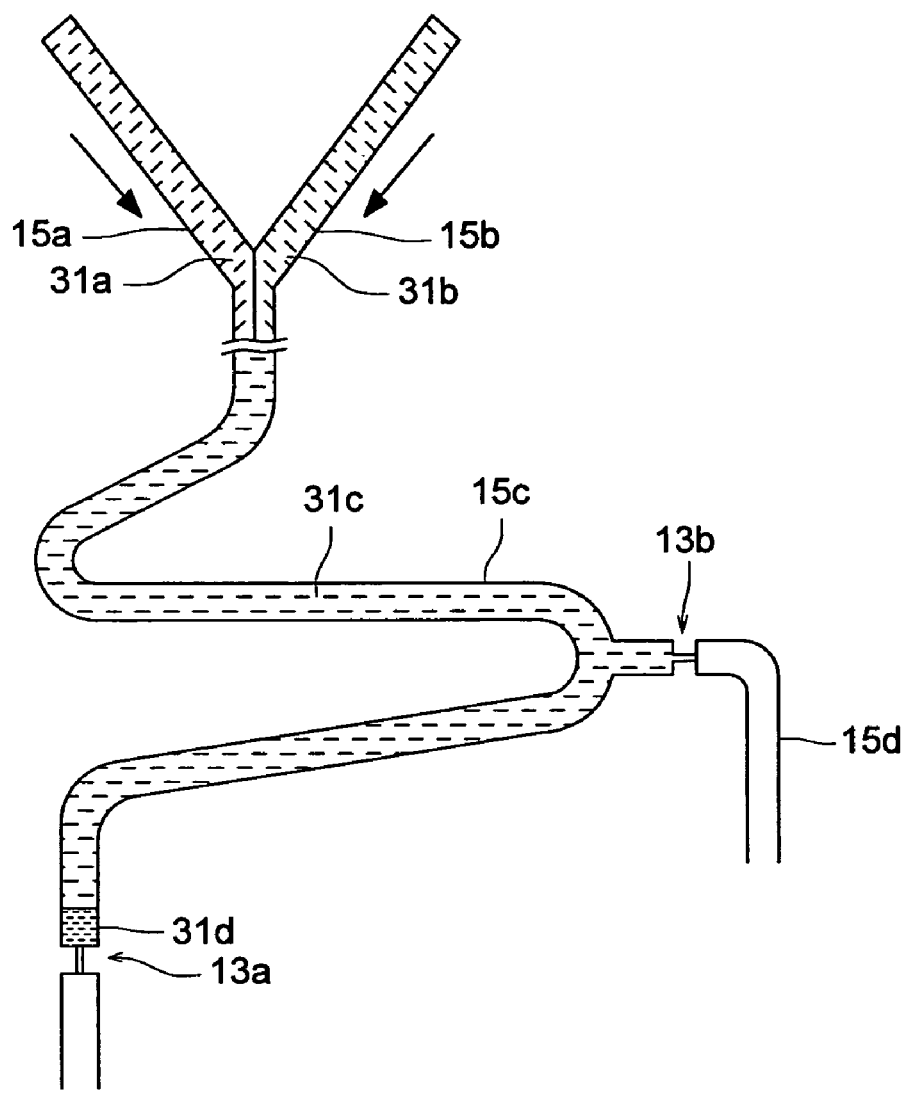
FIG. 6 is a drawing showing the flow path constitution in which the leading portion of the mixed fluid composed of two joined fluids is cut off and the mixed liquid is fed to the next step after stabilization of the mixing ratio.

In the case where 2 reagents are mixed by the Y-shaped flow path, even if both reagents are fed simultaneously, the mixing ratio for the front portion of the fluid is not stable. FIG. 6 shows the flow path structure in which the front portion is discarded and the mixture is fed to the next step after the mixing ratio has been stabilized. In FIG. 6, the reagents 31a and 31b which are mixed are fed from the flow paths 15a and 15b respectively to the mixing flow paths 15c.

The branched path 15d which feeds the fluid mixture 31c from the mixing flow path 15c to the next step is branched, and a first feed control section 13a is provided at a position beyond the branching point of the branched flow path 15d in the mixing flow path 15c. A second feed control section 13b is provided at a position in the vicinity of the branching point of the mixing flow path 15c in the branched flow path 15d and the feeding pressure which allows the fluid mixture 31c to pass is smaller than that of the first feed control section 13a.

The fluid mixture 31c of fluid 31a and fluid 31b which were fed from the flow path 15a and the flow path 15b to the mixing path 15c is fed into the mixing path 15c until the front end portion 31d of the fluid mixture 31c reaches the first feed control section 31a. After the front end portion 31d of the fluid mixture 31c reaches the first feed control section 31a, by further feeding into 15c, the fluid mixture 31c is passed from the second feed control section 13b to the branched flow path 15d, and then the fluid mixture 31c is fed to the next step.

For example, because the cross-sectional area of the fine flow paths in the first feed control section is smaller than the cross-sectional area of the fine flow paths in the second feed control section, the feeding pressure which allows passage of the fluid mixture 31c in the second feed control section 13b can be made smaller than that of the first feed control section 13a.

Fluid Feeding Control Method

In the electric control system for controlling the micro-pump 11 and in the system for setting a target value of the flow rate and supplying the drive voltage according to it to the micro-pump, a problem arises that due to change in the flow path resistance, the flow rate is varied from the target value. When a plurality of fluids are fed and joined by a plurality of micro-pumps, according to the fluid amount filled in the flow path after confluence, the degree of effect between the plurality of micro-pumps is changed. As a technology for dissolving it, the invention of a method for controlling the flow rate so as to coincide with the target value is disclosed in Unexamined Japanese Patent Application Publication 2004-270537. According to the present invention, the system is not further complicated by adding a circuit for controlling the mixing ratio of fluids to such a control system and there is an advantage that the system of the preceding invention can be maintained without modification.

The micro total analysis system of the present invention almost aims at the liquids among the fluids. Hereinafter, such a case will be explained more.

The inspection chip 2 is, for example, in a rectangular plate shape of dimensions of 50×76×3 mm and is preferably made of an elastic material having a self sealing property, and at least the detection section is transparent or semitransparent and has translucency. The inspection chip 2 having the self-sealing property, when it is just loaded on the surface of a glass substrate, is adhered close to it by self-adsorption. As a material of this inspection chip 2, for example, polydimethylsiloxane (PDMS) which is a kind of silicone rubber is used.

On the inspection chip 2, fine flow paths for analysis and chemical synthesis are patterned. An example of the size and shape of the fine flow paths is a slit having a rectangular section with a width of about 100 μm and a depth of about 100 μm. Further, the inspection chip 2 can adopt various constitutions and materials other than the aforementioned.

In the inspection chip, the pump connection, fine flow path, specimen storage section, reagent storage section, liquid feeding control section, reaction section, and detection section are installed and the sections are respectively connected by flow paths. Furthermore, to enhance the liquid feeding accuracy, it is desirable to arrange a reverse flow prevention section and a quantitative liquid feeding mechanism.

Hereinafter, one concrete example for mixing a plurality of liquids will be described. In FIG. 4, in reagent storage sections 18a, 18b, and 18c, reagents of more than 2.5 μl in total are stored and are mixed in a fluid mixing section 14 which is a junction, and the reagent mixed liquid of 7.5 μl in total with the front end discarded are fed to flow paths 15b, 15c, and 15d which are branched to three paths as the reagent mixed liquid of 2.5 μl each. For example, the liquids stored in the reagent storage sections 18b and 18c are the same buffer solution and it is mixed with the reagent stored in the reagent storage section 18a which is diluted to three times. One of the flow paths 15b, 15c, and 13d branched to three paths is connected to the mixture, reaction or detection system with a specimen liquid and the remaining flow paths are, for example, a flow path for control.

Figure 7:
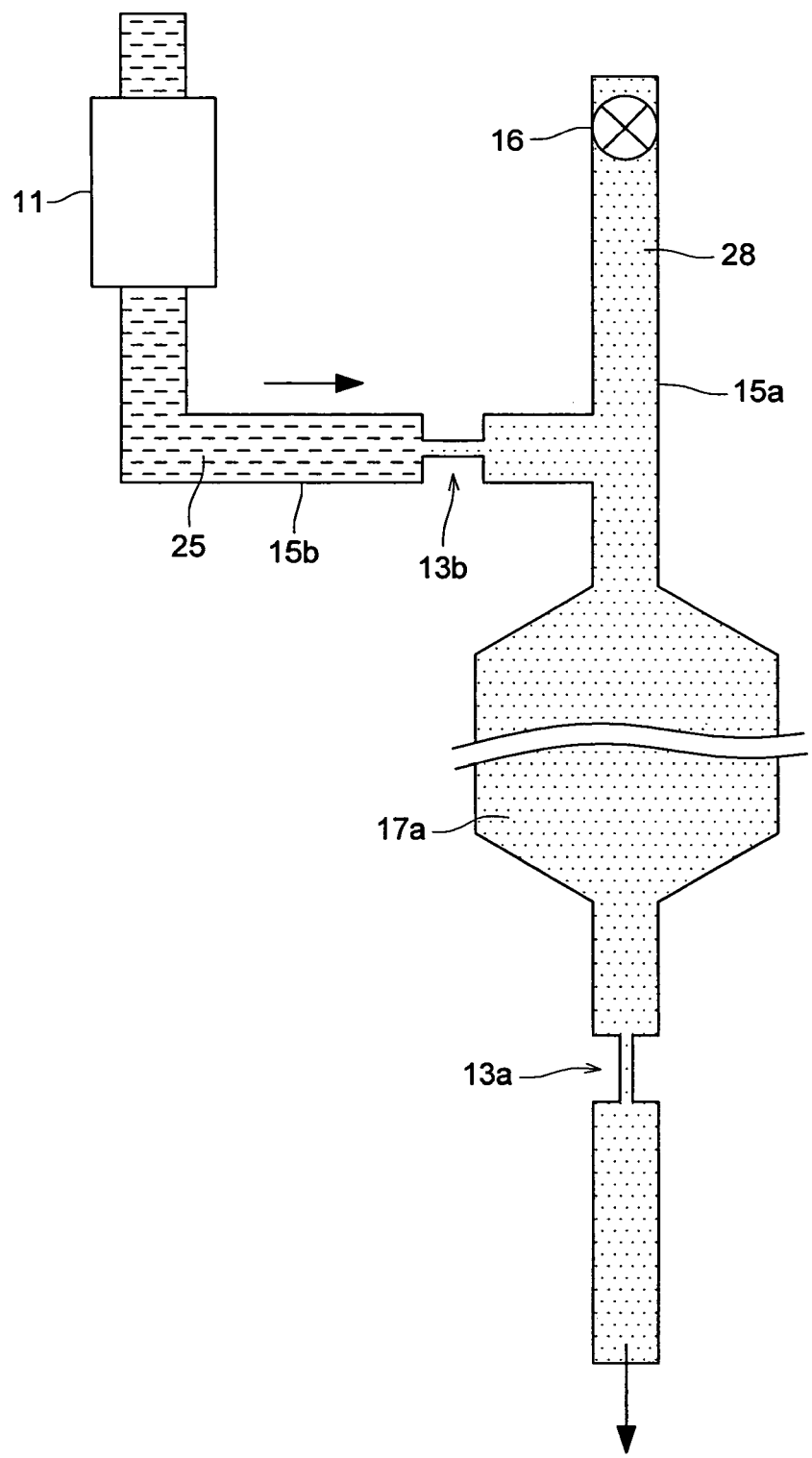
FIG. 7 is a drawing showing the constitution of a reagent quantification section for quantitatively feeding a reagent.

It is preferable to arrange a check valve for preventing a backward flow of a liquid and thereby for conducting a prescribed liquid-feeding accurately, as stated above, and a quantitative liquid-feeding mechanism shown in FIG. 7 can be given as an ideal mechanism employing a check valve. In this mechanism, reagents in a predetermined amount are filled in the flow path (reagent filling flow path 15a) between check valve 16 of backflow prevention section and feed control section 13a as a hydrophobic valve. There is further provided branched flow path 15b that is branched from the reagent filling flow path 15a and is communicated with micro-pump 11 that feeds driving liquid.

Quantitative liquid-feeding for reagents is conducted as follows. First, reagent liquid 28 is filled by supplying the reagent liquid 28 from the backflow prevention section 16 side to the reagent filling flow path 15a at liquid-feeding pressure which does not feed the reagent liquid 28 beyond the feed control section 13a. Then, at liquid-feeding pressure which allows the reagent liquid 28 to pass beyond the hydrophobic valve 13a, driving liquid 25 is fed by micro-pump 11 in the direction from branched flow path 15b to the reagent filling flow path 15a, whereby, the reagent liquid 28 filled in the reagent filling flow path 15a is squeezed out beyond liquid-feeding control section 15a, thus, the reagent liquid 28 is fed quantitatively. In the branched flow path 15B, there are sometimes present air and sealing liquid, and even in this case, it is possible to squeeze out reagents by feeding driving liquid 25 with micro-pump 11 and thereby feeding air and sealing liquid into the reagent filling flow path 15a. Meanwhile, it is possible to reduce fluctuations of a fixed quantity by providing reservoir section 17a having a large volume on the reagent filling flow path 15a.

It is possible to connect the micro-pump 11 to the specimen storage section and to control independently feeding of the specimen liquid from the specimen storage section and feeding of the reagent from the reagent storage section.

Embodiment of Analysis

The aforementioned inspection chip used for the micro total analysis system of the present invention is a chip in which a series of fine flow paths is formed so as to enable analysis of the target material in a specimen by performing the following process of:

in the inspection chip after the pump connection of the inspection chip and the chip connection of the micro-pump unit are liquid-tightly adhered closely to each other and then the inspection chip is mounted inside the base body:

feeding and joining the specimen stored in the specimen storage section or the target material included in the treated liquid in which the specimen has been treated in the flow path and the reagent stored in the reagent storage section to the flow path composing the reaction section and reacting them, feeding the obtained reaction product or treated material thereof to the flow path composing the detection part, and detecting it by the detection processor aforementioned.

Figure 8:
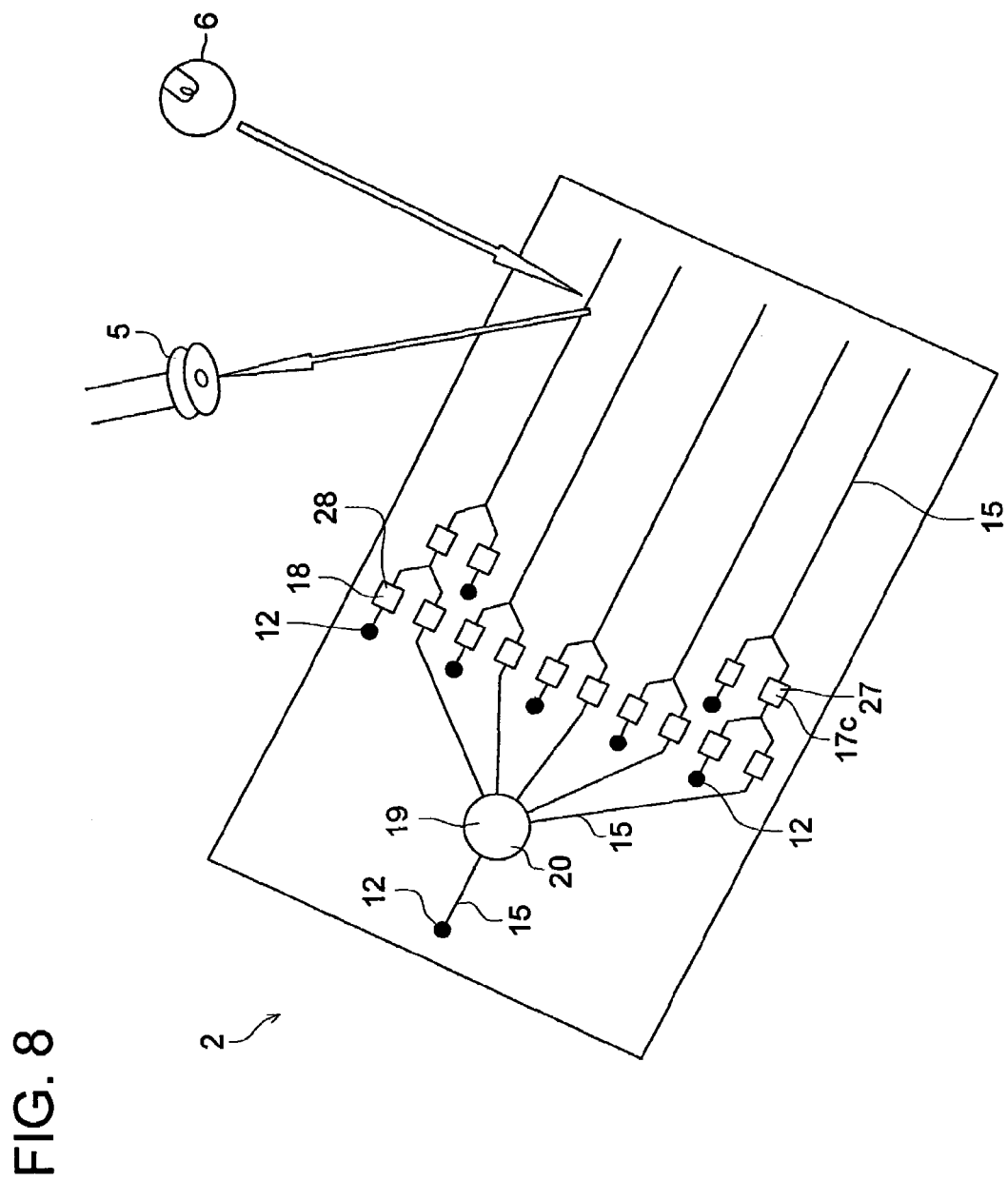
FIG. 8 is a drawing showing an aspect of analysis by an inspection chip. The drawing shows an example of the flow path constitution for executing confluence and mixture of fluids.

Typically, as shown in FIG. 8, reagents 28 stored in the plurality of reagent storage sections 18 positioned on the uppermost stream side are mixed in the flow path 15 on the downstream side of the reagent storage section and the mixed reagents are fed to the analytical flow path on the downstream side. In the analytical flow path, a specimen 19 and the mixed reagents from the Y-shaped flow paths are joined and mixed, and the reaction is started due to temperature rise, and the reaction is detected at the detection part installed on the downstream side of the flow path 15.

Specimen

The specimen to be measured in the invention is a sample containing an analyte originated from organism. There is no restriction in the samples itself and for example, almost all samples originated from organism such as whole blood, blood plasma, blood serum, baffy coat, urine, dejection, saliva and sputum are applicable.

In case of gene inspection, the gene as a nucleic acid which is a template of amplification reaction, DNA or RNA is the analyte. The specimen may be the one isolated or prepared from samples possibly contain such nucleic acid. Therefore, besides the above samples, cultured cell substance; the samples contain nucleic acid such as virus, bacteria, mould, yeast, plant and animal; the samples possibly contain or entrain germs, and other samples which may contain nucleic acid are applicable. Conventional technologies can be used for the method preparing gene, DNA or RNA from such samples without specific restriction. In the micro total analysis system of the invention, comparing with manual operation using conventional devices, the required amount of specimen is extremely small. For instance, only about 2 to 3µ litter of blood is injected to a chip measuring several centimeter in length and in width. For instance, in case of a gene, 0.001 to 100 ng of DNA is to be injected.

Inspection of Genes

The system of the invention can be used favorably, especially for the inspection of genes or of nucleic acid (DNA and RNA). In that case, the fine flow path of the inspection chip 2 is made to be of the structure suitable for PCR amplification, and the basic flow path structure can be substantially the same even for biological materials other than those for genetic testing. Usually, it has only to change specimen preprocessing sections, reagents and probes, and in that case, arrangement and number for solution-feeding elements may be changed. Those skilled in the art can change the types of analyses easily, by putting necessary reagents on the inspection chip 2 for an immunoassay method, and by making a modification including some changes of flow path element and specification changes. Bio-materials other than genes mentioned here mean various types of metabolites, hormone and protein (including an enzyme and an antigen).

In the preferred embodiment of the inspection chip 2, there are provided a specimen storage section in which the specimen or analyte substance (for example, DNA, RNA and genes) extracted from the specimen is injected in one chip, a specimen preprocessing section that conducts preprocessing of the specimen, a reagent storage section that holds a reagent to be used for a probe combination reaction and a detection reaction (including also a gene amplification reaction or an antigen-antibody reaction), a positive control storage section that holds a positive control, a negative control storage section that holds a negative control, a probe storage section that holds a probe (for example, a probe to hybridize to a gene to be detected that is amplified by a gene amplification reaction), a fine flow path that is communicated with respective storage sections and a pump connection that can be connected to a separate micro-pump capable of feeding liquids in the respective storage sections and flow paths.

To the inspection chip 2 as shown in FIG. 8, there is connected a micro-pump through pump connection 12, and thereby, a specimen 19 held in a specimen storage section 20 or a bio-material extracted from the specimen (for example, DNA or other bio-materials) and reagent 19 held in reagent storage section 18 are fed to the flow path 15, and are mixed to react at a reaction region of the fine flow path, for example, at a region of gene amplification reaction (an antigen-antibody reaction, in the case of protein), then, a process solution 27 having processed the reacted solution and a probe held in a probe storage section are fed to a detection section located in the flow path at the downstream side thereof so that the process solution may be combined with the probe (or may be hybridized), thus, the bio-material is detected based on this reactive product.

Further, in the same way as in the foregoing, the reaction and detection are conducted even for positive control held in the positive control storage section and negative control held in the negative control storage section.

A specimen storage section 20 in the inspection chip 2 is communicated with a specimen injecting section which holds a specimen temporarily and supplies the specimen to a mixing section. It is desirable that the specimen injecting section through which the specimen is injected into the specimen storage section 20 from its upper side is provided with a plug that is composed of an elastic body such as a rubber type material, or the specimen injecting section is covered by resin such as polydimethylsiloxane (PDMS) or by a reinforced film, for preventing leakage to the outside, infection and pollution and for securing tight sealing. For example, the specimen in syringe is injected by a needle pierced through the plug made of rubber material, or through a needle through which a thin hole having a cap penetrates. In the case of the former, it is preferable, that, when the needle is pulled out, the hole made by the needle is closed immediately. Or, another specimen injecting mechanism may also be provided.

The specimen 19 injected in a specimen storage section 20 is subjected to preprocessing through mixing of the specimen and the processing solution, for example, before mixing with reagent 28, as occasion demands, in the specimen preprocessing section provided on the flow path 15 in advance. Such a specimen preprocessing section may include a separation filter, resin for adsorption and beads. Preferable specimen preprocessing includes separation, or concentration and deproteinization of an analyte. A bacteriolysis process and a DNA extraction process are carried out using bacteriolysis agent such as 1% of SDS compound liquid.

Further, in reagent storage section 18 of the inspection chip 2, there is sealed prescribed amount of necessary reagent 28 in advance. Accordingly, it is not necessary to fill necessary amount of reagent 28 each time of using, resulting in a situation to be ready to use. When analyzing bio-materials in the specimen, reagents which are necessary for measurement are usually known commonly. For example, when analyzing an antigen existing in bio-materials, there is used reagent containing an antibody corresponding to the antigen, preferably containing monoclonal antibody. The antibody is preferably marked with biotin and FITC.

Reagents for gene inspection may include various reagents used for gene amplification, probes used for detection and color forming reagents, and even preprocessing reagents used for specimen preprocessing, as occasion demands.

By forcing out a specimen and a reagent for joining from respective storage sections when driving liquid is supplied by a micro-pump, there are started reactions necessary for analyses such as gene amplification reaction, trapping of an analyte or antigen-antibody reaction.

With respect to mixing of a reagent and a reagent, and mixing of a specimen and a reagent, the mixing may be conducted at a desired ratio at a single mixing section, or the mixing may be conducted so that a desired mixing ratio may be obtained finally, by providing plural joining points by dividing either one or both of them.

An embodiment of the reaction region of this kind is not limited in particular, and various embodiments and styles are considered. As an example, fine flow path where respective types of liquids are diffused and mixed is provided beyond a joining point (flow path diverging point) where two or more kinds of liquids including a reagent are joined, and reactions are carried out in a liquid reservoir composed of a space whose width is greater than that of fine flow path provided beyond the downstream side end of the aforesaid fine flow path.

As a DNA amplification method, a PCR amplification method can be used, which is described in various kinds of documents including improved technologies and used commonly in many aspects. In the PCR amplification method, it is necessary to control temperatures in three temperatures, and a flow path device capable of controlling temperatures suitable for the microchip has already been proposed by the inventors of the present invention (Unexamined Japanese Patent Application Publication No. 2004-108285). This device system may be applied to a flow path for amplification of the chip of the invention.

ICAN (Isothermal chimera primer initiated nucleic acid amplification) developed recently as an improvement of PCR has a characteristic of that DNA amplification can be carried out in a short period of time under an optional certain temperature in a range of 50-65° C. (U.S. Pat. No. 3,433,929) and it is a preferable amplification technology also for the invention.

In the downstream side of the reaction region in the fine flow path of the inspection chip 2, there is provided a detection region for detecting an analyte, for example, an amplified gene. Further, protein having affinity to biotin adsorbed to the detection region on the fine flow path (avidin, strepto avidin) combines specifically with biotin marked on probe substance, or biotin marked on 5' end of primer used for gene amplification reaction. Due to this, a probe marked with biotin or amplified gene is trapped on the detection region.

Though a method for detecting separated analyte or DNA of amplified target gene is not limited in particular, the following process is basically carried out as a preferred embodiment. Namely, (1a) a specimen or DNA extracted from a specimen, cDNA compounded through reverse transfer reaction based on a specimen or RNA extracted from a specimen and primer biotin-modified at 5' end position are fed from their storage sections to a fine flow path located at the downstream side.

Through the process to amplify a gene in a fine flow path of a reaction region, amplification reaction liquid containing gene amplified in the fine flow path and a denaturing liquid are mixed to make the amplified gene to be a single strand by denaturing reaction, and this and probe DNA marked at the end position with FITC (fluorescein isothiocyanate) are hybridized.

Then, a liquid is fed to the detection region in the fine flow path where protein having affinity to biotin is adsorbed, and the amplified gene is trapped in the detection region in the fine flow path. (Probe DNA marked with fluorescence may be hybridized after the amplified gene is trapped in the detection region.) (1b) A reagent containing antibody specific for the analyte such as an antigen, a metabolite and hormone existing in a specimen, preferably monoclonal antibody, is mixed with a specimen. In that case, the antibody is marked with biotin and FITC. Therefore, a product obtained through an antigen-antibody reaction has therein biotin and FITC. This product is fed to a detection region in a fine flow path which has adsorbed biotin-affinity protein (preferably, streptoavidin) to be fixed on the detection region through the combination of the biotin-affinity protein and the biotin. (2) A gold-colloidal liquid whose surface is modified with anti-FITC antibody that combines specifically with FITC is allowed to flow into the fine flow path, and thereby, the gold colloid is adsorbed by fixed analyte, antibody reactant FITC, or FITC modified probe hybridized with a gene. (3) The concentration of the gold colloid in the fine flow path is measured optically.

The embodiment of the present invention are explained above. However, the present invention is not limited to the embodiments, and the embodiments can be optionally modified and changed according to the spirit of the present invention, and the modifications are included in the present invention.

What is claimed is:

1. A micro total analysis system comprising:
an inspection chip including at least:
- a pump connection having a plurality of flow path openings for communicating with a micro-pump;
- a plurality of flow paths which have different flow path resistances and communicate with the plurality of flow path openings and in which fluid flows; and
- a fluid mixing section on which two or more fluids coming from the plurality of flow paths are joined and mixed, the system further comprising:
a system body including at least:
1) a base body;
2) a micro-pump unit which is positioned on the base body and includes:
a chip connection having a plurality of flow path openings for communicating with the inspection chip and a plurality of micro-pumps of substantially same shape which are driven by substantially same voltage and communicate with the plurality of flow path openings of the chip connection;
wherein the micro-pump unit permits fluid to flow in the inspection chip by a liquid-tight connection between the pump connection and the chip connection,
3) an optical detection system for optical detection of optical properties of the mixed fluid on the inspection chip to generate data related to the optical properties,
4) a detection processor for collecting the data from said optical detection system and for performing measurement and processing of the data; and
5) a controller for controlling at least functions of the micro-pump unit and the detection processor, wherein the controller is configured to drive each of the plurality of micro-pumps to permit fluid to flow from the plurality of flow paths to the fluid mixing section while the pump connection and the chip connection are connected liquid-tightly, and then the micro total analysis system achieves a mixing ratio m to n, which is a flow rate ratio of the two fluids joining at the fluid mixing section and is not 1 to 1 and which is determined by the flow path resistances.

2. The system of claim 1,
wherein the mixing ratio of m to n is determined by flow path resistance values of R1+R2 of the flow paths feeding two fluids to be joined, wherein R1 is a flow path resistance value from a micro-pump to the fluid mixing section and R2 is an effective internal flow path resistance value of the micro-pump at the driving voltage.

3. The system of claim 2,
wherein the mixing ratio m to n is a mixing ratio of a first fluid to a second fluid at the fluid mixing section is defined by the following formula:

(first flow path resistance)+(first effective internal flow path resistance)/(second flow path resistance)+(second effective internal flow path resistance)

wherein
the first flow path resistance is the flow path resistance of a first flow path of said plurality of flow paths,
the second flow path resistance is the flow path resistance of a second flow path of said plurality of flow paths,
the first effective internal flow path resistance is the effective internal flow path resistance of a first micropump of said plurality of micropumps,
the second effective internal flow path resistance is the effective internal flow path resistance of a second micropump of said plurality of micropumps,
said first flow path being in communication with said first micropump and said second flow path being in communication with said second micropump.

4. The system of claim 1,
wherein the flow path resistance value is determined based on at least one of sectional area and length of each of the plurality of flow paths feeding two fluids to be joined.

5. The system of claim 1,
wherein the mixing ratio of m to n is determined by the number of micro-pumps of the plurality of micro-pumps and the plurality of flow paths which feed fluids to be joined.

6. The system of claim 1,
wherein each of the plurality of flow paths in which fluid flows is a fine flow path having micron-size width provided on the inspection chip.

7. The system of claim 1,
wherein each of the plurality of micro-pumps comprises,
a third flow path having a third flow path resistance value which varies according to a pressure difference;
a fourth flow path having a variation ratio of a flow path resistance value with respect to a variation of a pressure difference which is smaller than in the third flow path;
a pressure chamber connected with the third flow path and the fourth flow path;
an actuator for varying internal pressure of the pressure chamber; and
a driving device for driving the actuator.

8. The system of claim 1,
wherein the inspection chip is operably mounted in the base body while the pump connection of the inspection chip keeps close contact with the chip connection of the micro-pump unit liquid-tightly.

* * * * *